(12) United States Patent
Ogawa et al.

(10) Patent No.: US 6,832,430 B1
(45) Date of Patent: Dec. 21, 2004

(54) PRODUCTION METHOD FOR MULTI-COLOR INNER PACKING MATERIAL

(75) Inventors: Masanori Ogawa, Tokai (JP); Norihiko Kioka, Tokai (JP)

(73) Assignee: Nagoya OilChemical Co., Ltd., Aichi (JP)

( * ) Notice: Subject to any disclaimer, the term of this patent is extended or adjusted under 35 U.S.C. 154(b) by 0 days.

(21) Appl. No.: 10/203,363
(22) PCT Filed: May 26, 2000
(86) PCT No.: PCT/JP00/03429
§ 371 (c)(1), (2), (4) Date: Aug. 7, 2002
(87) PCT Pub. No.: WO01/58599
PCT Pub. Date: Aug. 16, 2001

(30) Foreign Application Priority Data

Feb. 7, 2000 (JP) .................... 2000-029492
Mar. 30, 2000 (JP) .................... 2000-094445

(51) Int. Cl.[7] .................... B23P 19/04; B21D 39/03
(52) U.S. Cl. .................... 29/460; 29/428
(58) Field of Search .................... 29/460, 428; 526/346, 526/347.2; 427/282, 272; 118/504; 428/319.7, 36.5

(56) References Cited

FOREIGN PATENT DOCUMENTS

| JP | 359011335 | * | 1/1984 |
| JP | 360251954 | * | 12/1985 |
| JP | 409314007 | * | 12/1997 |
| JP | 410128197 | * | 5/1998 |

* cited by examiner

Primary Examiner—John C. Hong
(74) Attorney, Agent, or Firm—Cooper & Dunham LLP; Donald S. Dowden

(57) ABSTRACT

A manufacturing method of a multicolored interior member is provided in the present invention. Said manufacturing method comprises a base member and a surface member attached on a surface of said base member comprising; forming concave groove(s) in preset portion(s) of said base member, tucking said surface member into said concave groove(s) to form parting line, covering said surface member attached on one side from said parting line with a masking member, forming an engaging flange at the end edge of said masking member, inserting said engaging flange into the crevice of said parting line to fix said masking member, and then coating said surface member attached on the other side from said parting line with a different color from the color of the surface member attached on one side from said parting line.

6 Claims, 5 Drawing Sheets

PRODUCTION METHOD FOR MULTI-COLOR INNER PACKING MATERIAL

This application is a 371 of PCT/JP00/03429 May 26, 2000

FIELD OF THE INVENTION

The present invention relates to a manufacturing method of a multicolored interior member used as the interior member of a car and the like.

BACKGROUND OF THE INVENTION

Up to now, an interior member (51) such as the head lining of a car having a front section (51A) and a rear section (51B), having different colors respectively as shown in FIG. 9, has been manufactured by forming a concave groove (53) in a preset portion of a base member (52) to divide into the front section and the rear section, attaching a pair of surface members (54A, 54B) each having different colors, and tucking the end edge of each surface member (54A, 54B) into said concave groove (53) to form a clear parting line PL in the border between both surface members (54A, 54B) as shown in FIG. 10 (U.S. Pat. No. 4,779,390

Nevertheless, in said prior art, a pair of surface members (54A, 54B) of different colors, must be separately prepared for the front and rear sections (51A, 51B) of the interior member, so that production costs are raised, and time and labor are necessary to attach said surface members to said base member separately (52). Further, it is difficult to mold said base member and surface members together simultaneously putting said surface members on said base member.

DISCLOSURE OF THE INVENTION

To solve said problems of the prior art, the present invention provide a manufacturing method of the multicolored interior member, comprising a base member and a surface member attached to the surface of said base member comprising; forming concave groove(s) in preset portion(s) of said base member, then tucking said surface member into said concave groove(s) to form a parting line, covering said surface member attached on one side from said parting line with a masking member, forming an engaging flange at the end edge of said masking member, inserting said engaging flange into the crevice of said parting line to fix said masking member, and then coating said surface member attached on the other side from said parting line with a different color from that of the surface member attached on one side from said parting line. Said masking member is preferably made of a thermoplastic resin or a thermoplastic resin foam, and said surface member is preferably made of a material(s) whose thickness can change elastically to fix said engaging flange of said masking member by the elastic restoring force accompanying the compression with the changing thickness of said surface member.

Said masking member (4) is attached to said interior member (1) of the present invention on one side from said parting line, thus the one side is coated in a different color from that of the other side. In this way, just one-colored surface member (3) will be adequate.

Said masking member (4) can be fixed by inserting said engaging flange (41) at its end edge into the crevice of said parting line on said surface member (3A, 3B) not shown.

BRIEF DESCRIPTION OF THE DRAWINGS

FIG. 1 is a perspective view of the instrument panel and the masking member before coating.

FIG. 2 is a sectional view taken along line A—A of FIG. 1.

FIG. 3 is a perspective view of the masking member attached on the surface of the instrument panel and then coated.

FIG. 4 is a sectional view taken along line B—B of FIG. 3.

FIG. 5 is a perspective view of a multicolored instrument panel.

FIG. 6 is a perspective view of the masking member attached on the surface of the instrument panel and then coated.

FIG. 7 is a sectional view taken along line C—C of FIG. 6.

FIG. 8 is a perspective view of a multicolored head lining.

FIG. 9 is a perspective view of a head lining.

FIG. 10 is a sectional view taken along line D—D of FIG. 9.

In the drawings,

Figure 1:
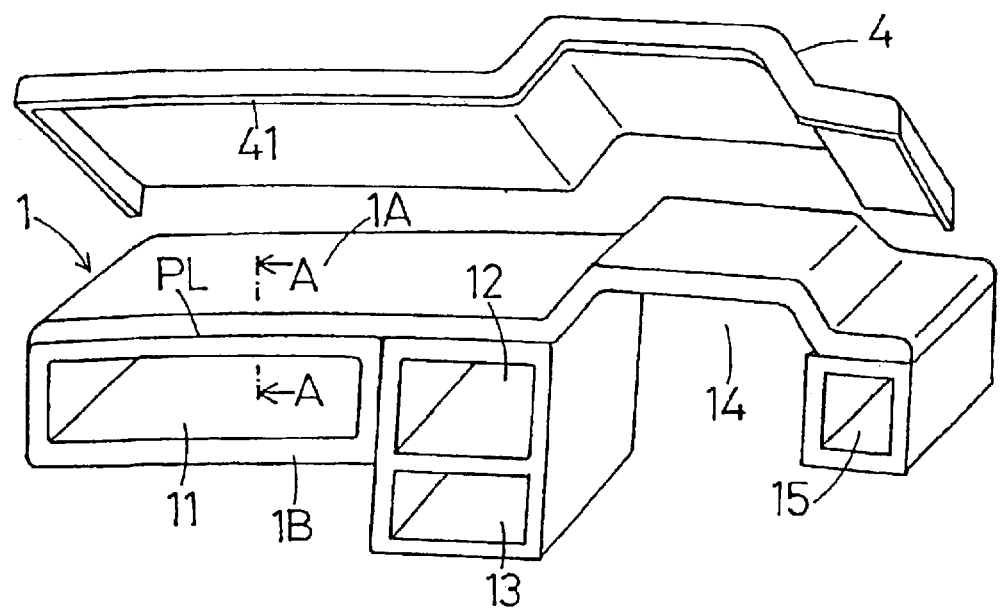
FIGS. 1 to 5 show an embodiment of the present invention.

1 . . . interior member (instrument panel)
2 . . . base member
21, 61 . . . concave groove
3, 8 . . . surface member
4, 10 . . . masking member
41, 10A . . . engaging flange
5 . . . head lining (interior member)
5A . . . front section
5B . . . rear section
PL . . . parting line
S . . . crevice Preferred Embodiment Referring now to FIGS. 1 to 5, illustrating the present invention, the instrument panel (1) of a car has a hole (11) into which a glove box is installed, a pair of holes (12,13) into which audio equipment is installed, a hole (14) into which instruments are installed, a hole (15) into which a glove compartment is installed, and the like, and said instrument panel (1) is divided into upper and lower sections (1A, 1B).

Figure 2:
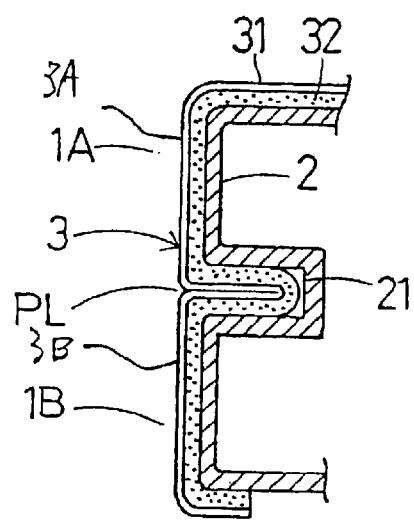

Said instrument panel (1) comprises a bases member (2) and a surface member (3) attached on said base member (2) as shown in FIG. 2, and said surface member (3) comprises a surface layer (31) which is, for instance, a non-woven fabric, a synthetic leather and the like and a wadding member (32) backing said surface layer (31). Said wadding member (32) is such as a non-woven fabric, a foamed plastics sheet and the like, and said surface member (31) is colored with a preset color (base color), and the thickness of said wadding member (32) can be changed elastically.

Along the border between the upper and lower sections (1A, 1B), a concave groove (21) is formed on said base member (2). A pair of surface members (3) is attached on the upper and lower sections (1A, 1B) respectively, and a parting line PL is formed by tucking the end edge of each surface member (3). When the end edge of each surface member (3) is tucked into said concave groove (21), the thickness of said wadding member (32) of each surface member (3) is compressed respectively and each surface member (3) is fixed by the elastic restoring force of said compressed wadding member (32) respectively in said concave groove (21).

Figure 4:
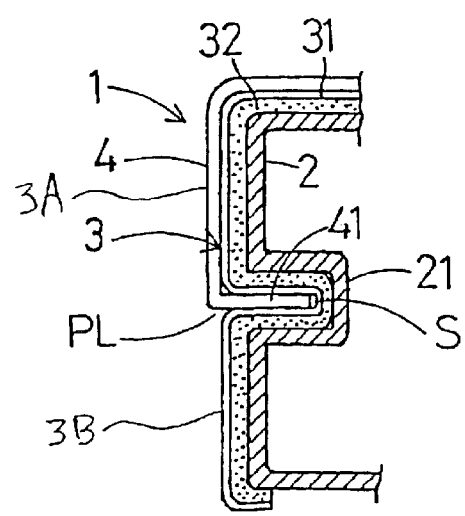

Since the upper and lower sections (1A, 1B) of said instrument panel (1) are covered with same kind of surface member (3), the upper and lower sections (1A, 1B) of said instrument panel (1) have the same color (base color). Said instrument panel (1) may be equipped in a car as it is, but if desirable, the color of the upper section (1A) and that of the lower section (1B) are settled to be differently. To provide two-colored instrument panel (1), a masking member (4) is used as shown in FIG. 4. Said masking member (4) has a shape fitting to that of the upper section (1A) of said instrument panel (1) and an engaging flange (41) is formed at the end edge of said masking member (4).

Figure 3:
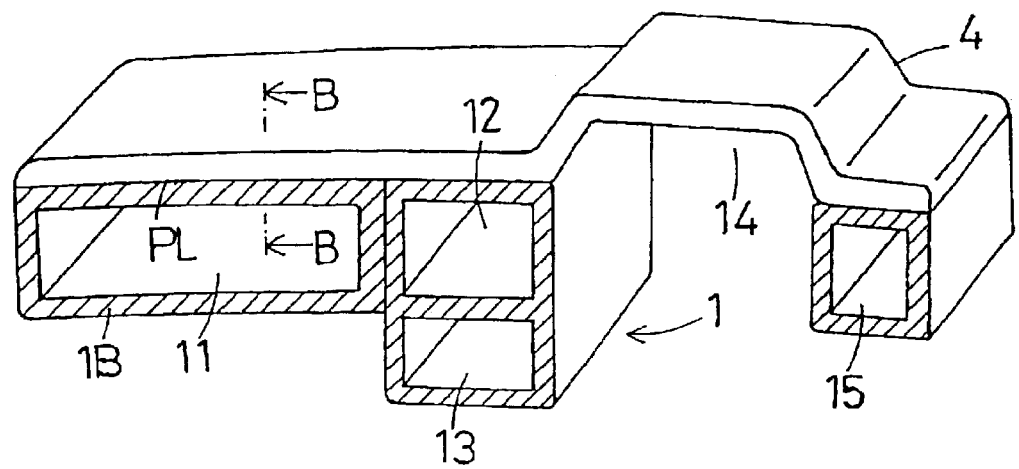

Said masking member (4) is attached on the upper section (1A) of said instrument panel (1) as shown in FIG. 3, and said engaging flange (41) is tucked into the crevice S of said parting line PL to fix said masking member (4) on the upper section (1A) of said instrument panel (1) as shown in FIG. 4. When said engaging flange (41) is tucked into the crevice S of said parting line PL, said wadding member (32) of each surface member (3) is compressed respectively, and said engaging flange (41) is fixed by the elastic restoring force of said compressed wadding member (32) of each surface member (3) in the crevice S.

After said masking member (4) is attached on the upper section (1A) of said instrument panel (1), the lower section (1B) of said instrument panel (1) is coated with a different color from that of the upper section (1A) by spray coating and the like. After coating, said masking member (4) is removed from the upper section (1A).

Figure 5:
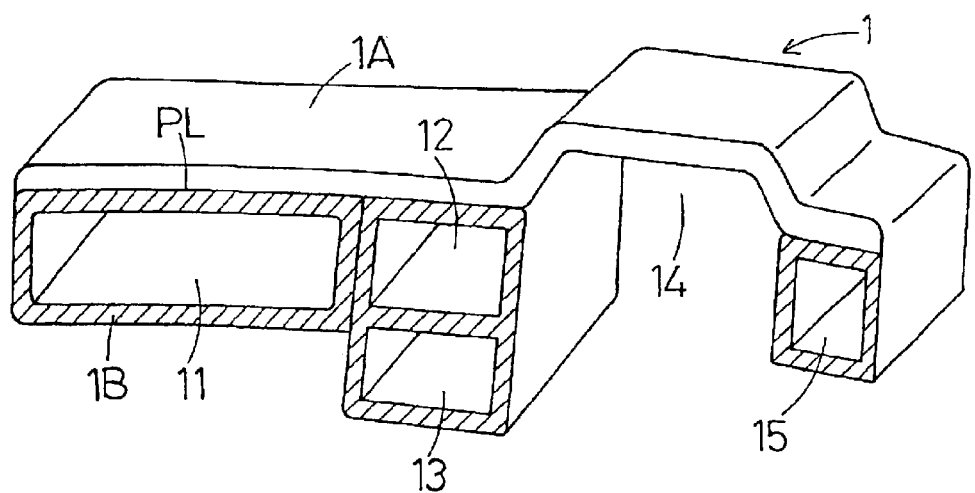

As above described, a multicolored (two-colored) instrument panel (1) as shown in FIG. 5 is easily manufactured.

A thermoplastic of said masking member (4) is such as polyethylene, polypropylene, ethylene-propylene copolymer, ethylene-vinylacetate copolymer, polyvinyl chloride, polyvinylidene chloride, polystyrene, polyvinyl acetate, fluorocarbon resin, thermoplastic acrylic resin, thermoplastic polyester, thermoplastic polyamide, thermoplastic urethane resin, acrylonitrile-butadiene copolymer, styrene-butadiene copolymer, acrylonitrile-butadiene-styrene copolymer, and the like. Two or more kinds of said thermoplastic may be mixed together. The thermoplastic mentioned above may be copolymerized with mono- and/or polyunsaturated carboxylic acid and/or acid anhydride thereof. The thermoplastic having softening temperature under 150° C. is suitable for use in this invention.

An engineering plastic used as a material of a thermoplastic for said masking member (4) is such as: thermoplastic-type engineering plastic such as polyacetal (POM), polycarbonate (PC), polyethylene terephthalate (PET), polybutylene terephthalate (PBT), polysulphone (PSF), polyethersulphone (PES), polyphenyleneoxide (PPO), polyphenylenesulfide (PPS), polyallylate (PAR), polyether-etherketone (PEEK), polyamideimide (PAI), polyimide (PI), polyetherimide (PEI), polyaminobismaleimide, methylpentene copolymer (TPX), cellulose acetate (CA) and the like; liquid crystal-type engineering plastic such as polyallylether and the like; compression molding-type engineering plastic such as fluorocarbon resin such as polytetrafluoroethylene (PTFE) and the like; amorphous polymer; polyaminobismaleimide; bismaleimido-triazine thermosetting aromatic polyimide; and the like. Two or more kinds of said engineering plastic may be mixed together.

The thermoplastic of masking member includes polymer alloys comprising the engineering plastic mentioned above and the thermoplastic resin(s) mentioned above, such as, for example polymer alloy of PPO (a.k.a. PPE) and high impact polystyrene, polymer alloy of PPO, polyamide and high impact polystyrene, polymer alloy of PPO, polyamide and polystyrene, polymer alloy of PPO and polyamide, polymer alloy of PPO and PTFE, polymer alloy of PE and high impact polystyrene, polymer alloy of PE and polyamide, polymer alloy of polyamide and modified polyolefin, polymer alloy of polyamide and acrylonitrile/styrene/butadiene copolymer (ABS), polymer alloy of polyamide and PTFE, polymer alloy of PBT and acrylic rubber, polymer alloy of PBT and ABS, polymer alloy of PBT, polyester ether elastomer, polymer alloy of PBT and PET, polymer alloy of PBT and PC, polymer alloy of PBT and PTFE, polymer alloy of PET and PTFE, polymer-alloy of PET and PAR, polymer alloy of PC and PTFE, polymer alloy of PAR and PTFE, polymer alloy of POM and thermoplastic urethane polymer, and the like. Polymer alloys of PPO and polyamide such as the polymer alloy of PPO, polyamide and polystyrene, the polymer alloy of PPO, polyamide and high impact polystyrene and the polymer alloy of PPO and polyamide, are the most suitable for use in this invention.

Said polyamide used for above described polymer alloys is such as: poly(tetramethylene adipamide) (nylon46), poly (hexamethylene adipamide) (nylon66), polypyrrolidone (nylon4), poly caprolactam (nylon6), polyheptolactam (nylon7), polycaprilactam (nylon8), polynonanolactam (nylon9), polyundeca 1 lactam (nylon11), polydodeca 1 lactam (nylon12), polyhexamethylene azelaic acid amide (nylon69), polyhexamethylene sebacic acid amide (nylon610), polyhexamethylene phthalamide (nylon6iP), polyhexamethylene terephthalamide, polyhexamethyleneisophthalamide, polytetramethyleneisophthalamide, poly(m-xylene adipamide), nylonMSD6, polyamide consisting of hexamethylenediamine and n-dodecanedioic acid (nylon612), polyamide consisting of dodecamethylenediamine and n-dodecanedioic acid (nylon1212), hexamethylene adipamide/caprolactam (nylon66/6), hexamethylene adipamide/hexamethyleneisophthalamide (nylon66/nylon6iP), hexamethylene adipamide/hexamethyleneterephthalamide (nylon66/nylon6T), trimethylhexamethylene oxide/hexamethylene oxide (nylontrimethyl-62/62), hexamethylene adipamide/hexamethylene azelaic acid amide (nylon66/nylon69), hexamethylene adipamide/hexamethylene azelaic acid amide/caprolactam (nylon66/nylon69/nylon6), poly(capronamide/hexamethylene sebacic acid amide) (nylon6/610), poly (capronamide/hexamethylenedodecanoic acid amide) (nylon6/612), (nylonMXD6), poly(capronamide/hexamethyleneisophthalamide) (nylon6/6I), aromatic polyamide and the like. Preferable polyamides are poly (hexamethylene adipamide) (nylon66) and poly caprolactam (nylon6). Two or more kinds of said polyamides may be mixed together in the present invention. In the case of mixing the engineering plastic and the thermoplastic resin, the ratio of engineering plastic to thermoplastic resin is usually from 1:99 to 99:1 by weight. Preferably, the ratio of the engineering plastic to the thermoplastic resin is from 20:80 to 80:20 by weight, and more preferably from 30:70 to 70:30, and ideally, from 40:60 to 60:40.

Formability of polymer alloys of engineering plastics is improved better than that of engineering plastics. In case of vacuum forming, its formability is improved in particular. Also affinity of polymer alloys with a coating layer can be enhanced.

Further rubbers and/or elastomers may be mixed into the thermoplastics. Preferred rubbers or elastomers for mixing into said polymer alloys include such as polyester, polyacrylate, acrylic rubber (AR), butyl rubber, silicone rubber, urethane rubber (UR), fluoride type rubber, polysulfide synthetic rubber, grafted rubber, butadiene rubber (BR), polybutadiene isoprene rubber (IR), chloroprene rubber, isoprene rubber (IR), polyisoprene, chloroprene rubber (CR), polyisobutylene rubber (IBR), polybutene rubber, thiokol rubber, polysulfide synthetic rubber, polyether rubber, epichlorohydrin rubber, norbornene terpolymer, modified polybutadiene having hydroxyl or carboxyl group as terminal group, partially hydrogenated styrene/butadiene block copolymer, chlorosulfonated rubber, isobutene/butadiene rubber (IIR), acrylate-butadiene rubber (ABR), styrene-butadiene rubber (SBR), styrene-chloroprene rubber, acrylonitrile-butadiene rubber (NBR), acrylonitrile-chloroprene rubber, pyridine/butadiene rubber, styrene/isoprene rubber (SIR), ethylene/styrene copolymer, polyolefin rubbers including synthetic rubber and natural rubber, such as ethylene/propylene copolymer (EP), ethylene/propylene/ethylidene copolymer (e.g. ethylene/polypropylene/ethylidene norbornene copolymer), ethylene/1-butene/ethylidene norbornene copolymer rubber, ethylene/propylene/diene copolymer (EPDM) (e.g. ethylene/propylene/dicyclopentadiene copolymer rubber, ethylene/propylene/1,4-hexadiene copolymer rubber), ethylene/1-butene copolymer rubber (e.g. ethylene/1-butene/cycropentadiene copolymer rubber, ethylene/1-butene/1,4-hexadiene copolymer rubber), and the like; styrene type thermoplastic elastomer such as styrene-butadiene-styrene block copolymer (SBS), styrene-isoprene-styrene block copolymer (SIS), α-methylstyrene-butadiene-α-methylstyrene block copolymer (α-MeS-Bd-MeS), α-methylstyrene-isoprenc-α-methylstyrene block copolymer, styrene-ethylene/butadiene-styrene copolymer (SEBS), styrene-rubbery compound-styrene block copolymer and the like. The rubbers or elastomers mentioned above can contain carboxyl group(s). The rubbers and/or elastomers can be mixed for use. Under 200 parts by weight of the rubber or elastomer are usually added to 100 parts by weight of the thermoplastic or polymer alloys.

In the present invention, one or more kinds of filler such as an inorganic filler such as calcium carborate, magnesium carborate, barium sulfate, calcium sulfate, calcium sulfite, calcium phosphate, calcium hydroxide, magnesium hydroxide, aluminium hydroxide, magnesium oxide, titanium oxide, iron oxide, zinc oxide, alumina, silica, diatomaceous earth, dolomite, gypsum, talc, clay, asbestos, mica, glass fiber, carbon fiber, calcium silicate, bentonite, white carbon, carbon black, iron powder, aluminium powder, stone powder, blast furnace slag, fly ash, cement, zirconia powder and the like; natural fiber such as cotton, hemp, wool and the like; organic synthetic fiber such as polyamide fiber, polyester fiber, acryl fiber, viscose fiber, acetate fiber, vinylchloride fiber, vinylidenechloride fiber and the like; inorganic fiber such as asbestos fiber, glass fiber, carbon fiber, ceramics fiber, metal fiber, whisker and the like; an organic filler such as linter, linen, wood powder, coconuts powder, walnut powder, starch, wheat flour and the like may be added to the thermoplastic of said masking member. When said filler is mixed in said polymer alloy, the dimensional stability, compressive and tensile strength and the like may be improved. Said filler is usually added to the materials of said masking member in an amount between 0.5 and 200% by weight.

Said masking member made of said thermoplastic may be colored by a pigment or a dyestuff to discriminate the masking parts, and also, a plasticizer such as a DOP, a DBP and the like, an antioxidant, an antistatic-electricity agent, a crystallization agent, a flame retardant, an antiflaming agent, an insecticide, an antiseptic, waxes, a lubricant, an age resister, an ultraviolet absorber, a blowing agent such as a chemical blowing agent or a capsule type blowing agent, and the like may be mixed with said polymer alloy. Two or more kinds of said agents may be mixed and then added to said masking member.

To manufacture the masking member by using said thermoplastic as a material, it may be preferable to use a method comprising melting said thermoplastic(s) or thermoplastic foam(s) to form a film or a sheet (a non-foamed sheet or a formed sheet) and vacuum forming said film or sheet to mold a desirable shape because said method may be suitable for mass-production, but press molding, blow molding, injection molding may be used besides said vacuum forming.

Two or more kinds of non-foamed sheet or two or more kinds of foamed sheet may be laminated, or one or more kinds of non-foamed sheet and one or more kinds of foamed sheet may be laminated together. Further, a foamed non-thermoplastic sheet such as foamed polyurethane sheet may be laminated on said non-foamed sheet, or said foamed sheet, or said laminated sheet.

In order to enhance the affinity between the surface of the masking member made of said thermoplastics and paint or adhesive, treatment such as corona discharge treatment, primer coating treatment and the like, may be applied on a part of the surface or the whole surface of said masking member. A primer used in said primer coating treatment is, for example: synthetic rubber such as modified polyolefin or an olefin copolymer such as chlorinated polypropylene, an ethylene-vinylacetate copolymer, styrene-butadiene rubber, acrylonitrile-butadiene rubber, chloroprene rubber, polybutadiene rubber and the like, synthetic resin such as an acrylic synthetic resin, a vinyl synthetic resin, an acrylic synthetic resin containing a functional group such as amino, amide and the like, a vinyl synthetic resin containing a functional group such as amino, amide and the like, an amino synthetic resin, an epoxy synthetic resin and the like; and a low-molecular weight primer such as an aluminum alcholate or an aluminum chelate agent such as aluminum isopropylate, tris(acetylacetonato)aluminum and the like; alkyl metal such as 2-ethylhexyl lead, hexadecyl lithium; an organotin compound such as dibutyl tin diacetate, di-n-butyl tin dioxide; a silane compound such as methylvinyldichloro silane and the like; metal complex salt of 1,3-dicarbonyl compound such as acetylacetone lithium, acetylacetone beryllium and the like; an organotitanium compound such as tetrabutyl titanate and the like; a boric acid compound such as tri-n-butyl borate, triphenyl borate and the like; phosphate such as trioleil phosphate, tridecyl phosphate and the like; metal salt of a carboxylic acid such as magnesium stearate, cobalt naphthenate and the like; metal tioalcholate such as n-dodecylmercapto potassium salt and the like; tiodicarboxylate salt such as zinc 2-ethylhexanedithiocarboxylate and the like; ditiocarbamate salt such as nickel dimethyldithio carbamate, copper dimethyldithio carbamate and the like; sulfonate such as nickel benzensulfonate sulfonate and the like; an olganophosphate compound such as vanadium dibutylphosphate and the like. One or more kinds of said primers may be mixed together. Said primer is a synthetic resin or a rubber or above described various kinds of primer, and said primer has a good adhesiveness with paint vehicle of said engineering plastic used as the material of said masking member or the synthetic resin excepting said engineering resin which is used as adhesive. A preferable primer is an acrylic synthetic resin containing quaternary ammonium salt or aminoplast.

For primer coating treatment, a solution or an emulsion of one or more kinds of said primer is coated on the surface of said masking member and then dried.

Prior to said primer coating treatment, affinity treatment may be applied on the surface of said masking member. The examples of said affinity treatment are flame treatment, sulfuric acid treatment, corona discharge treatment and the like, and the surface of said masking member is slightly carbonized by said treatment to obtain affinity with other synthetic resins.

Figure 6:
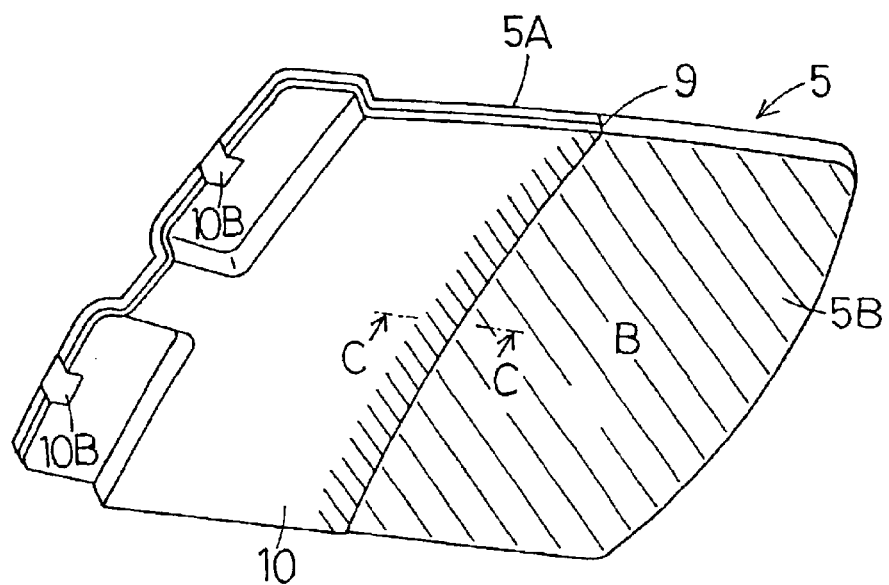
FIGS. 6 to 8 show the other embodiment of the present invention.
Figure 7:
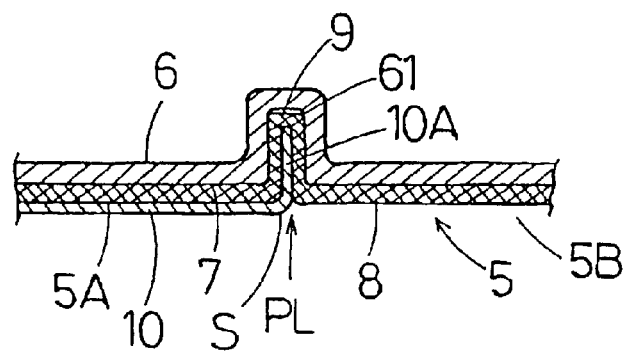
Figure 8:
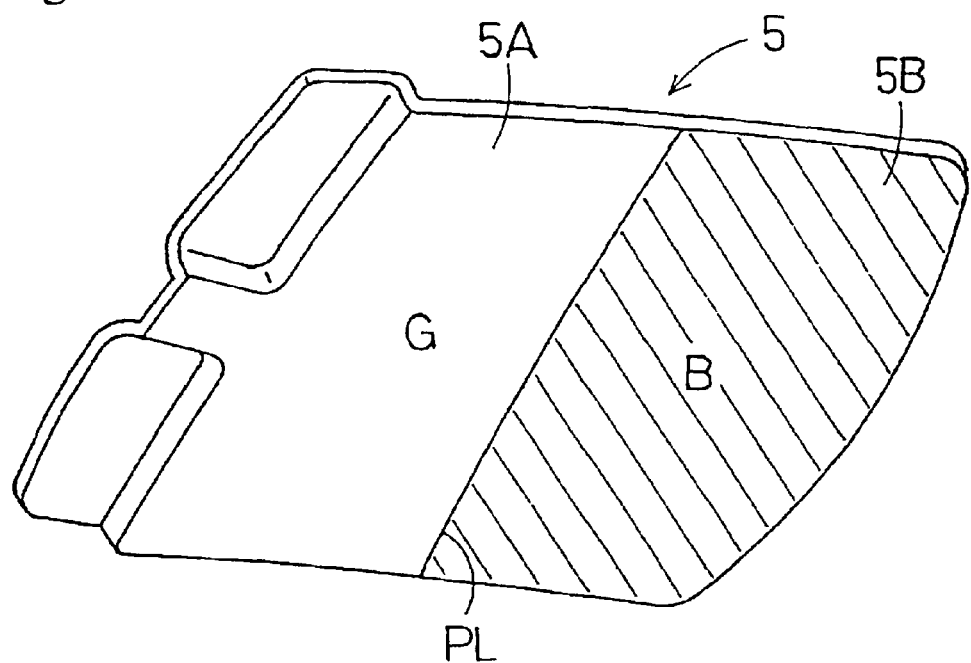
Figure 9:
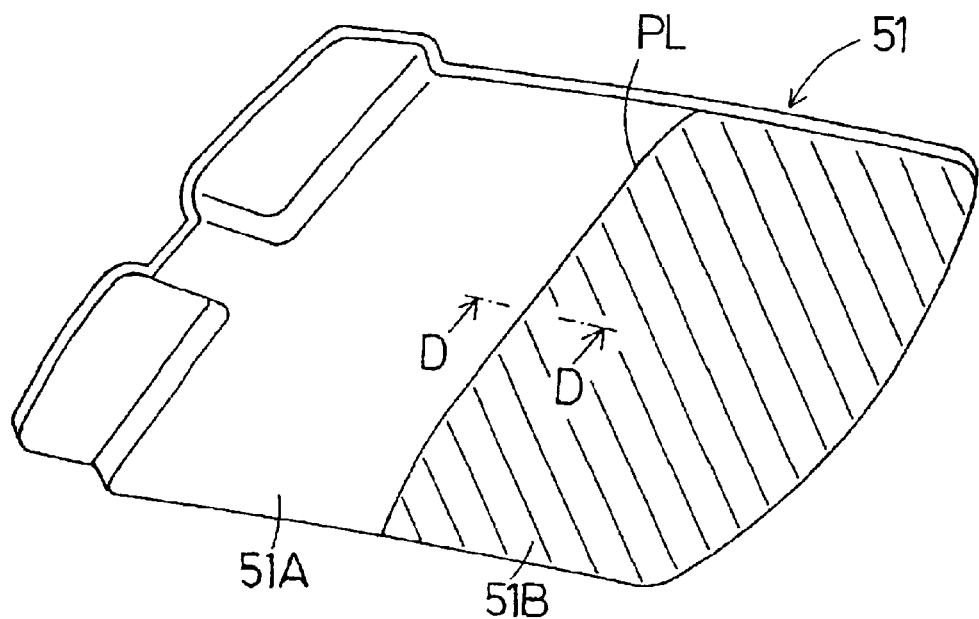
FIGS. 9 and 10 show a traditional masking member.
Figure 10:
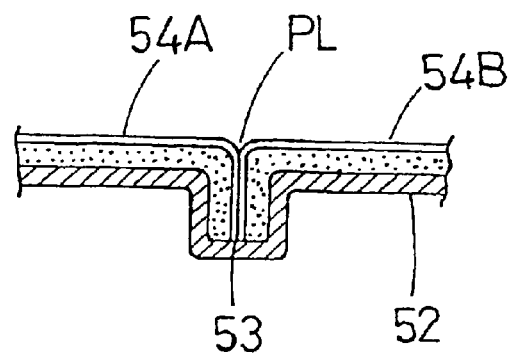

FIGS. 6 to 8 relate to another embodiment of the present invention. The head lining (5) of a car in this embodiment comprises a base member (6) such as a felt in which a synthetic resin is used as a binder, and a surface member (8) consisting of polypropylene non-woven fabric and the like attached on said base member (6) by a hot-melt sheet (7) such as polyethylene sheet and the like. Said head lining (5) is divided into the front section (5A) and the rear section (5B), and a concave groove (61) is formed along the border between the front section (5A) and the rear section (5B).

Said head lining (5) is manufactured by attaching said surface member (8) on said base member (6) by said hot-melt sheet (7) and then molding said base member (6) together with said surface member (8). Or said head lining (5) is manufactured by backing said surface member (8) with said hot-melt sheet (7), and heating said hot-melt sheet (7) to soften, and piling said surface member (8) on said base member (6), and then press-molding said base member (6) together with said surface member (8).

Said surface member (8) of said head lining (5) is colored, for instance, with gray G, and a masking member (10) is attached on the front section (5A) of said head lining (5). Said masking member (10) is molded in a shape fitting to the shape of the surface of the front section (5A) of said head lining (5) and the engaging flange (10A) is formed at the end edge of said masking member (10). Said engaging flange (10A) of said masking member (10) is tucked into the crevice S of the parting line PL in said concave groove (61) of said head lining (5), and the front end of said masking member (10) are fixed by a pair of pieces (10B) of the adhesive tape.

After said masking member (10) is attached on the front section (5A) of said head lining (5), a black dyestuff solution is sprayed on the rear section (5B) to color said rear section (5B) in black color B. After said coloring, said masking member (10) is removed from the front section (5A), and the two-colored head lining (5) of a car whose front section (5A) is colored in gray G and rear section (5B) is colored in black B is obtained as shown in FIG. 8.

FIELD OF THE INDUSTRIAL USE

The present invention is applicable to many kinds of car interior member, other than the instrument panel and head lining, such as the door trim. In the present invention, only one surface member is used for an interior member, the designated section of which can be in a variety of colors as specified, after which an optional mono-color or multicolored interior member can be obtained easily and at a low price.

What is claimed is:

1. A manufacturing method of a multicolored interior member comprising a base member and a surface member which is colored with a present color and attached on a surface of said base member comprising: forming concave groove(s) in present portion(s) of said base member, tucking said surface member into said concave groove(s) to form a parting line defining a crevice, covering said surface member attached on one side from said parting line with a masking member, forming an engaging flange at the end edge of said masking member, inserting said engaging flange into the crevice of said parting line to fix said masking member, and then coating said surface member attached on the other side from said parting line with a different color from that of the surface member attached on one side from said parting line.

2. The manufacturing method of a multicolored interior member in accordance with claim 1, wherein said masking member is made of a thermoplastic resin(s).

3. The manufacturing method of a multicolored interior member in accordance with claim 1, wherein said masking member is made of a thermoplastic foam.

4. The manufacturing method of a multicolored interior member in accordance with claim 3, wherein said surface member is made of a material(s) whose thickness can change elastically to fix said engaging flange of said masking member by the elastic restoring force accompanying the compression with the changing thickness of said surface member.

5. The manufacturing method of a multicolored interior member in accordance with claim 1, wherein said surface member is made of a material(s) whose thickness can change elastically to fix said engaging flange of said masking member by the elastic restoring force accompanying the compression with the changing thickness of said surface member.

6. The manufacturing method of a multicolored interior member in accordance with claim 2, wherein said surface member is made of a material(s) whose thickness can change elastically to fix said engaging flange of said masking member by the elastic restoring force accompanying the compression with the changing thickness of said surface member.

* * * * *